(No Model.) 8 Sheets—Sheet 3.
E. W. ROSS.
FEED CUTTER.
No. 460,268. Patented Sept. 29, 1891.
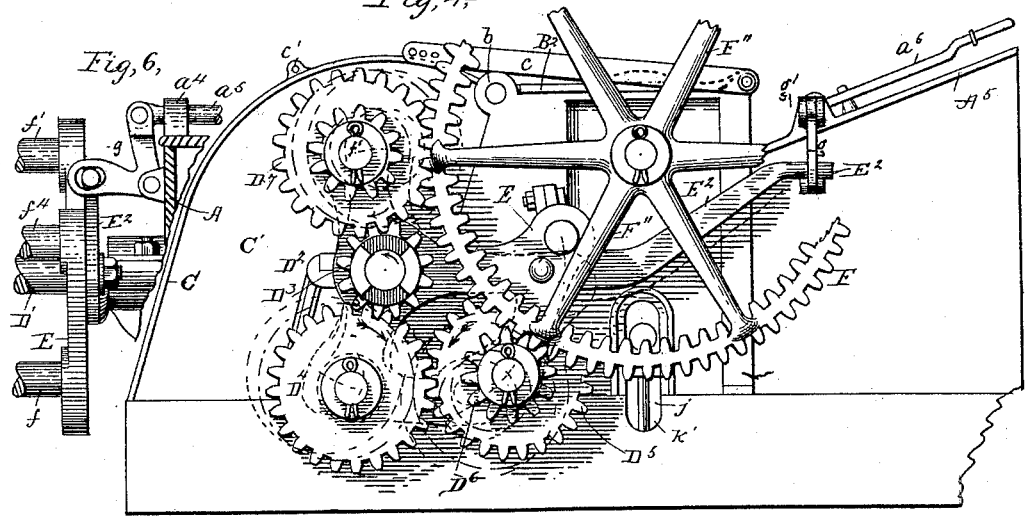
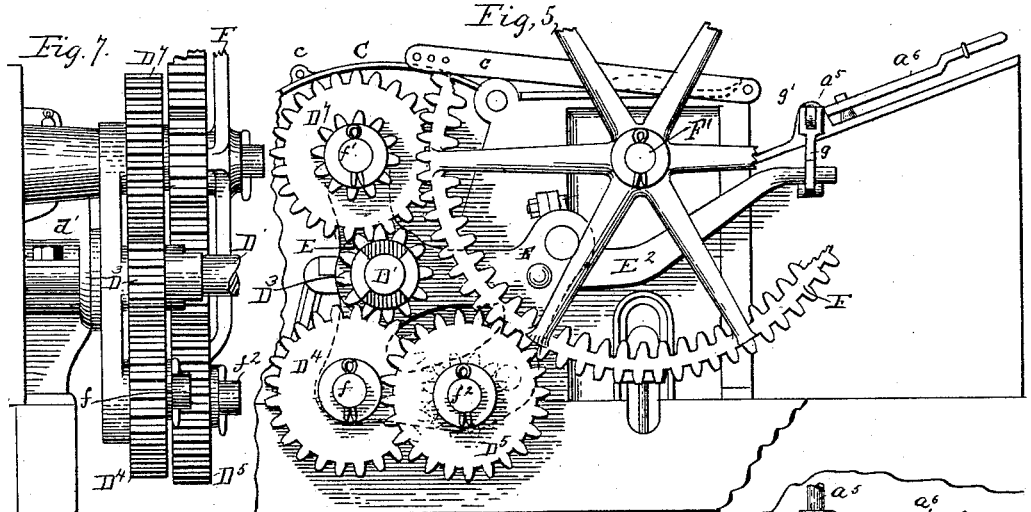
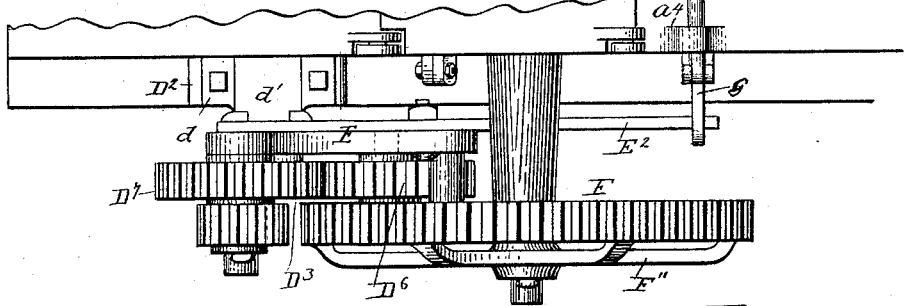
Witnesses:
Rex M. Smith.
J. E. Robertson.
Inventor:
Elmore W. Ross,
By A. M. Smith & Son
Attorneys.

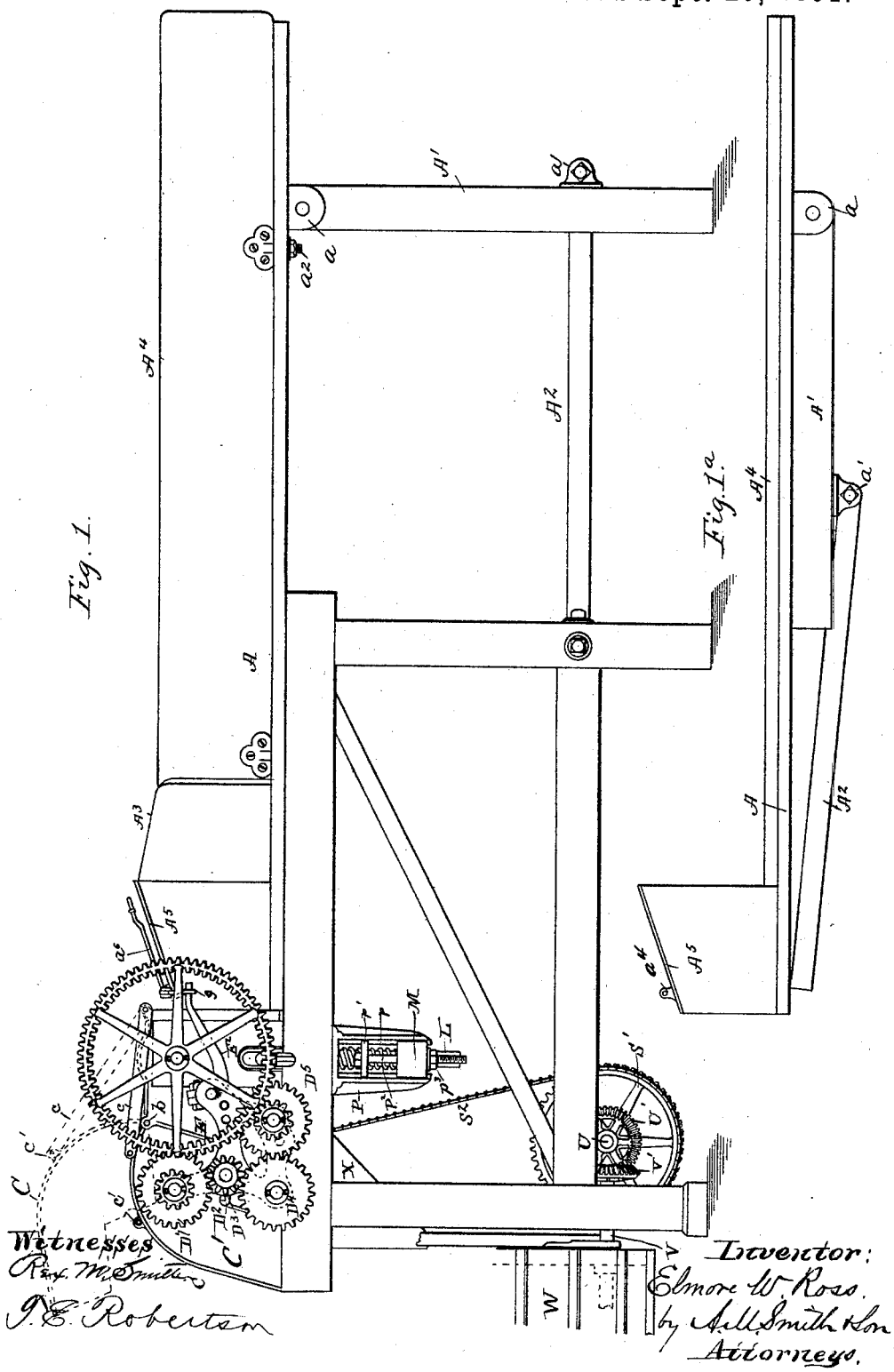

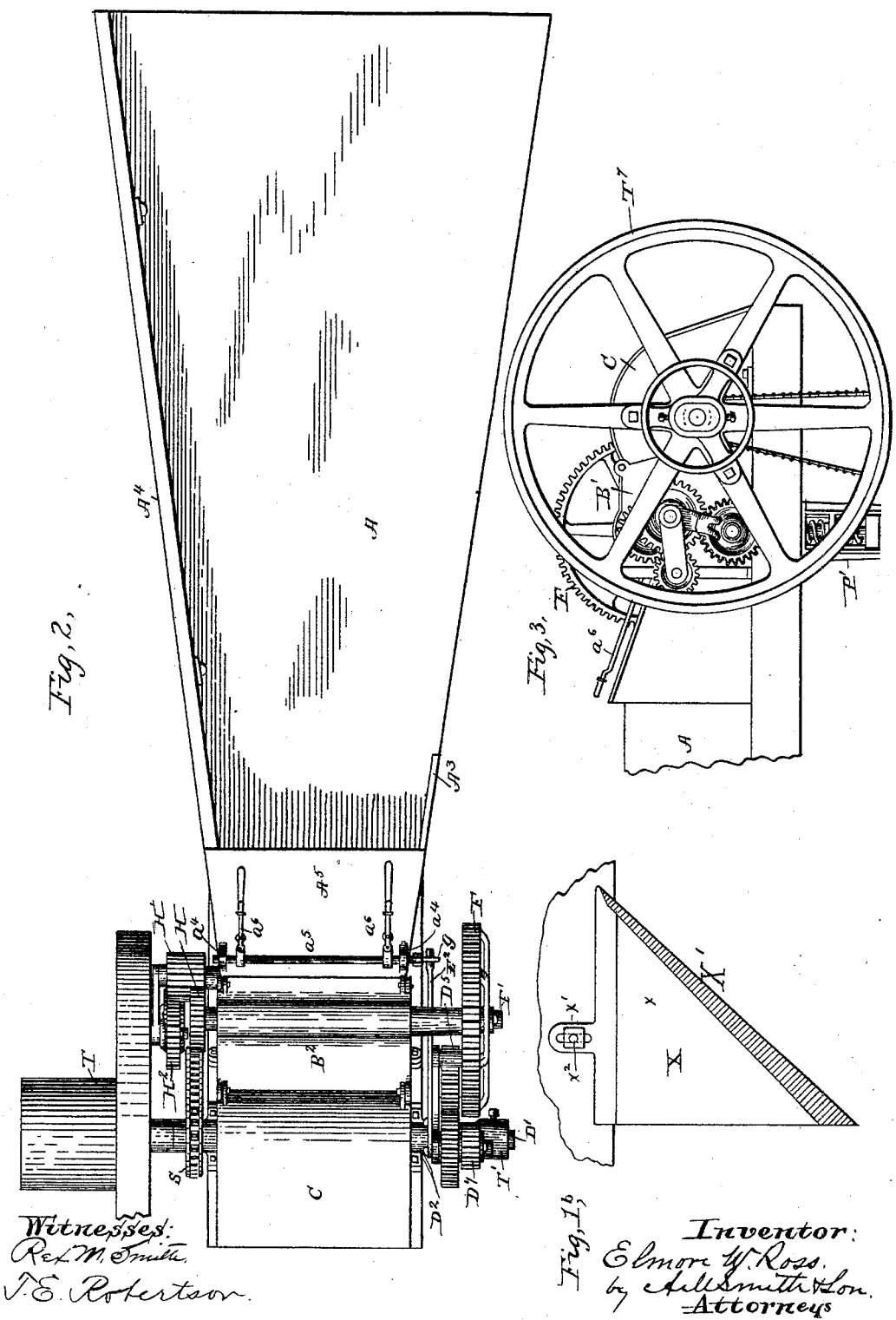

(No Model.) 8 Sheets—Sheet 4.
E. W. ROSS.
FEED CUTTER.
No. 460,268. Patented Sept. 29, 1891.
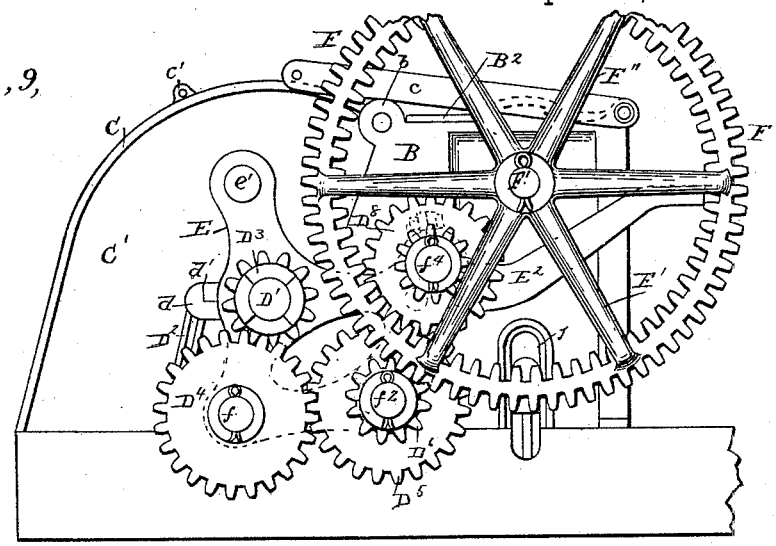
*Fig. 9.*
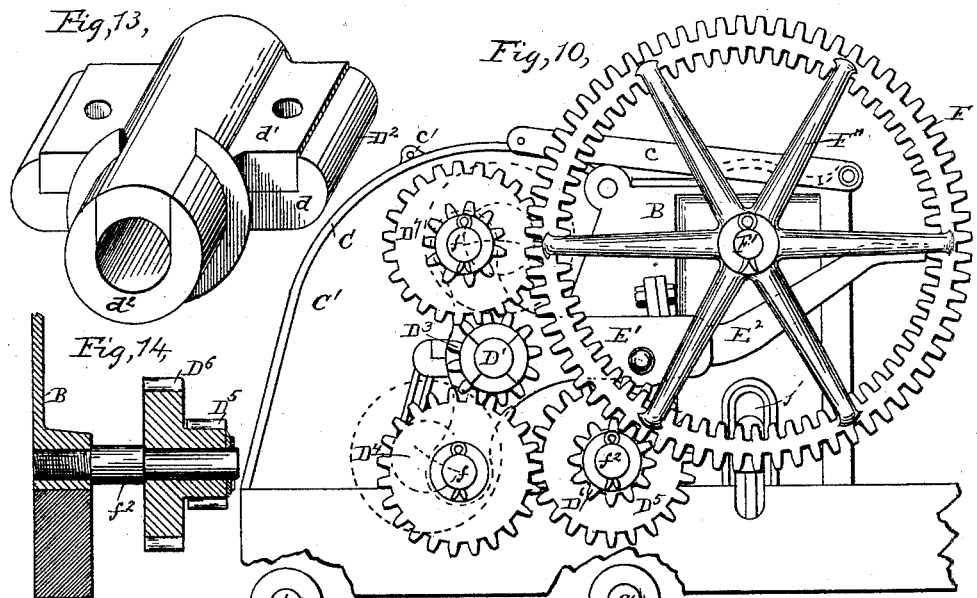
*Fig. 13.*
*Fig. 10.*
*Fig. 14.*
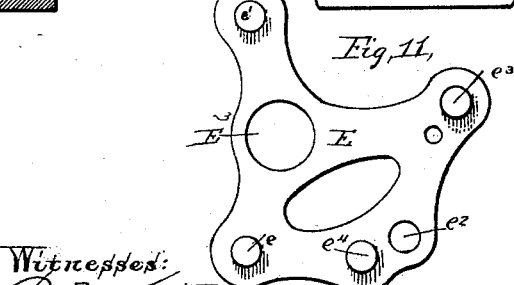
*Fig. 11.*
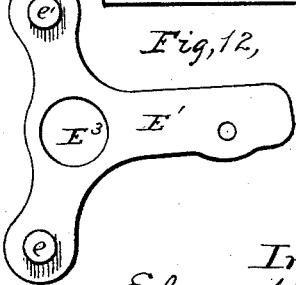
*Fig. 12.*
Witnesses:
Rex M. Smith
T. E. Robertson
Inventor:
Elmore W. Ross.
By A. L. Smith & Son
Attorneys.

(No Model.) 8 Sheets—Sheet 5.
E. W. ROSS.
FEED CUTTER.
No. 460,268. Patented Sept. 29, 1891.
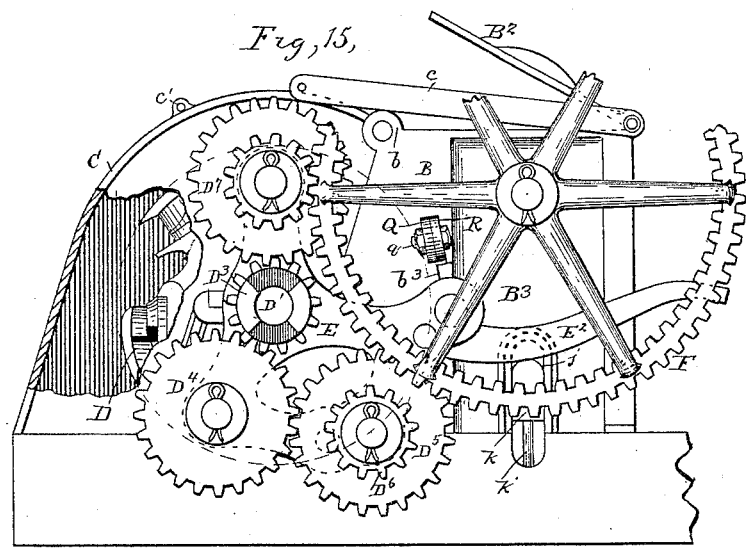
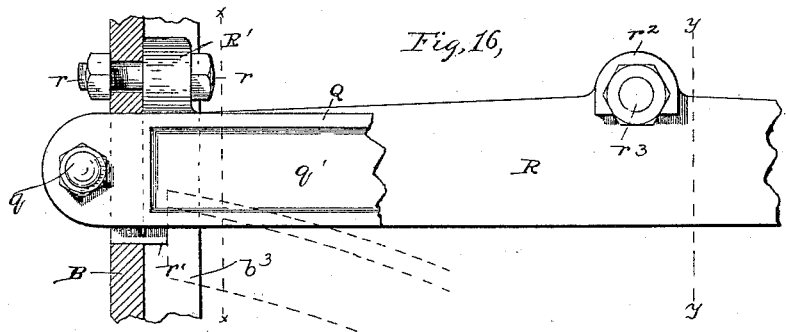
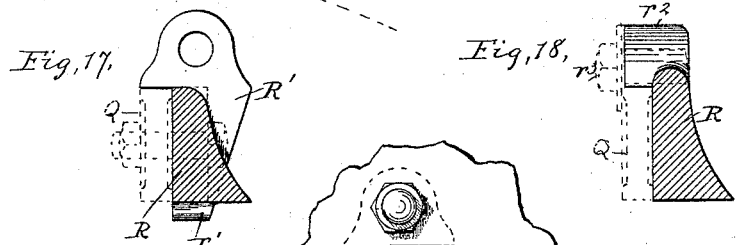
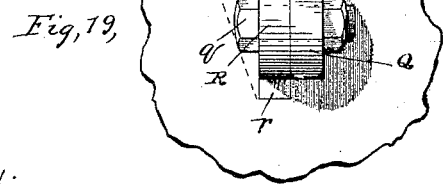
Witnesses:
Rex M. Smith.
J. E. Robertson.
Inventor:
Elmore W. Ross,
By A. M. Smith & Son
Attorneys (No Model.) 8 Sheets—Sheet 6.
E. W. ROSS.
FEED CUTTER.
No. 460,268. Patented Sept. 29, 1891.
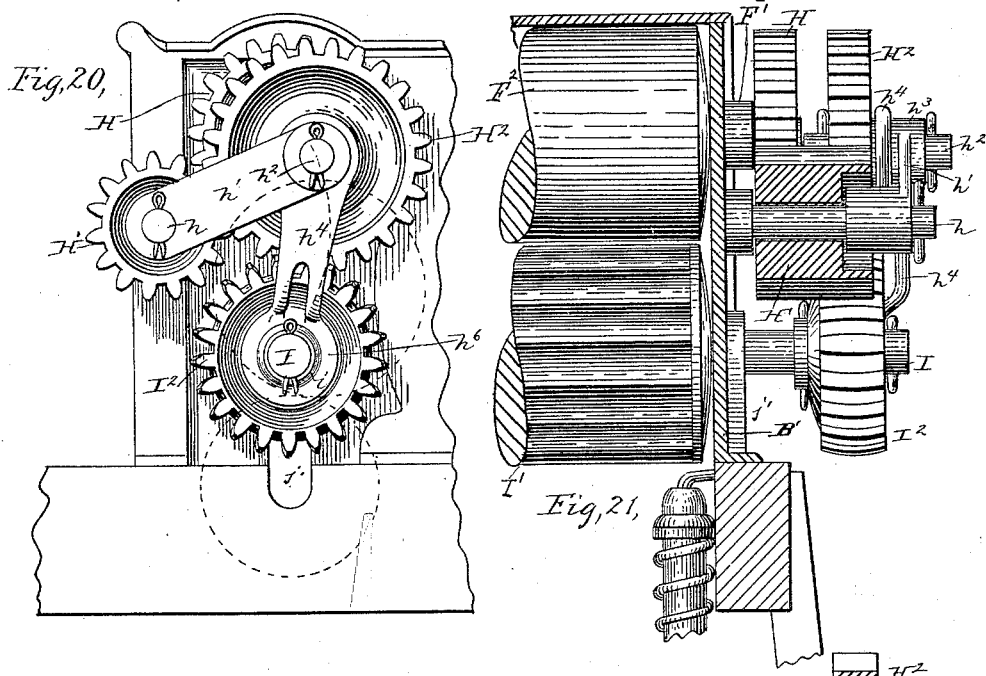
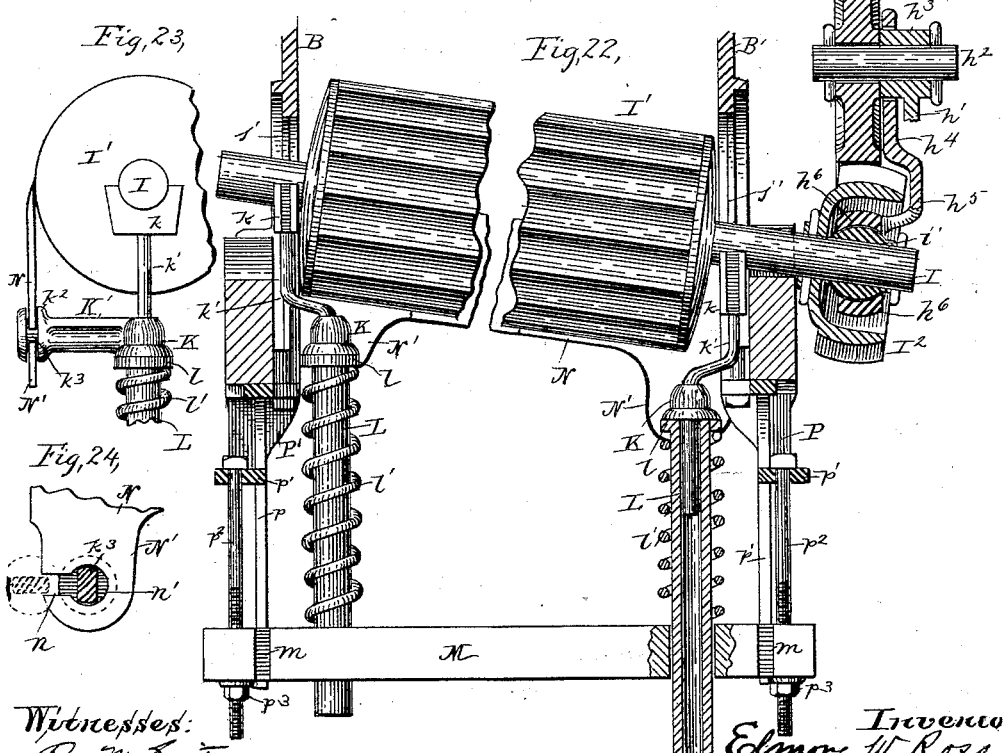
Witnesses:
Rex. M. Smith
J. E. Robertson
Inventor:
Elmore W. Ross,
By A. U. Smith & Son,
Attorneys.

(No Model.) 8 Sheets—Sheet 7.

E. W. ROSS.
FEED CUTTER.

No. 460,268. Patented Sept. 29, 1891.

Witnesses:
Rex M. Smith
T. E. Robertson

Inventor:
Elmore W. Ross
By Mill Smith & Son
Attorneys.

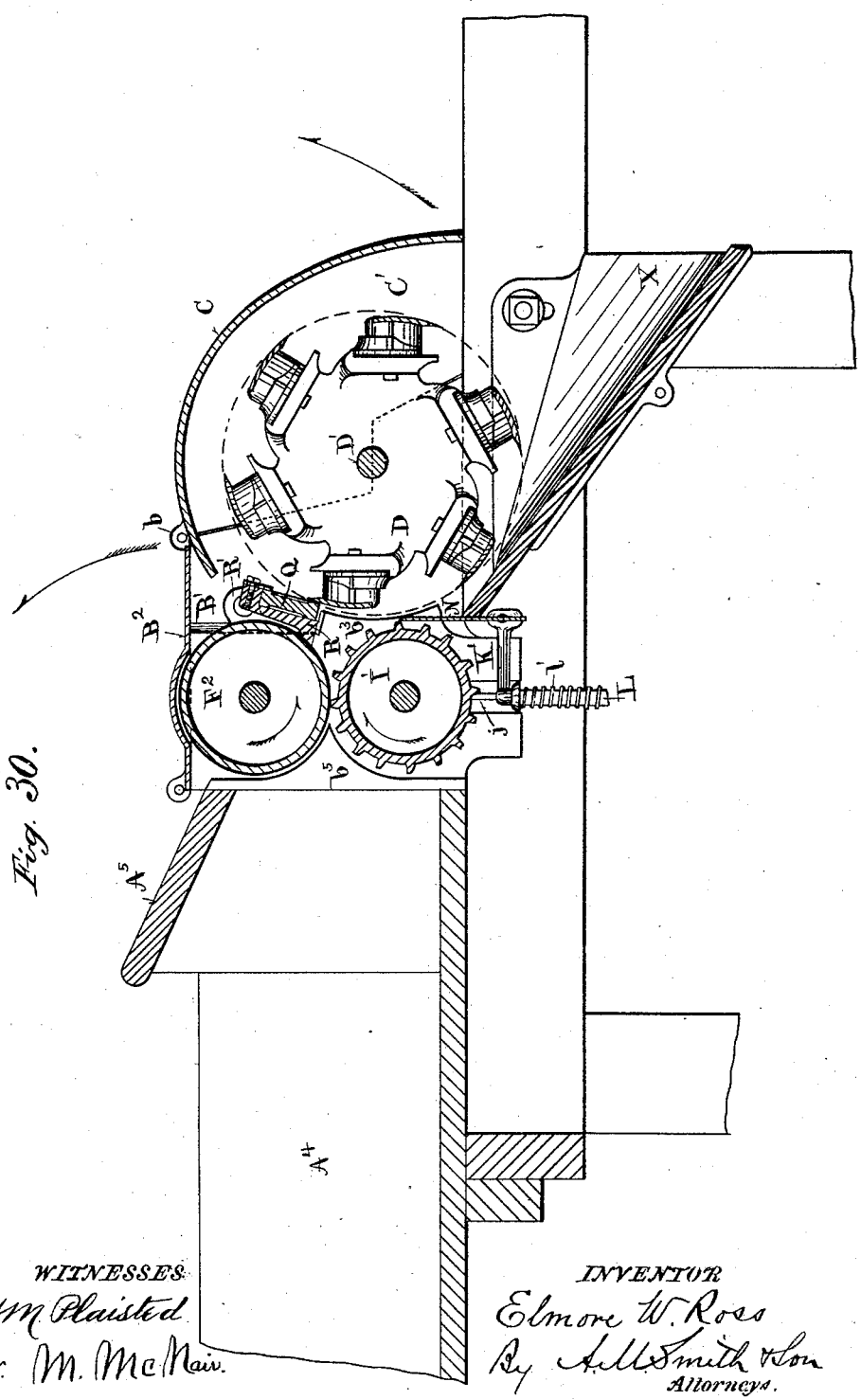

UNITED STATES PATENT OFFICE.

ELMORE W. ROSS, OF SPRINGFIELD, OHIO.

FEED-CUTTER.

SPECIFICATION forming part of Letters Patent No. 460,268, dated September 29, 1891.

Application filed November 4, 1889. Serial No. 329,127. (No model.)

*To all whom it may concern:*

Be it known that I, ELMORE W. ROSS, a citizen of the United States, and a resident of Springfield, county of Clark, and State of Ohio, have invented a new and useful Improvement in Feed-Cutters, of which the following is a full, clear, and exact description, reference being had to the accompanying drawings, making part of this specification.

My invention relates to certain details of construction and arrangement of parts of the machine, as hereinafter fully described and claimed.

Figure 29:
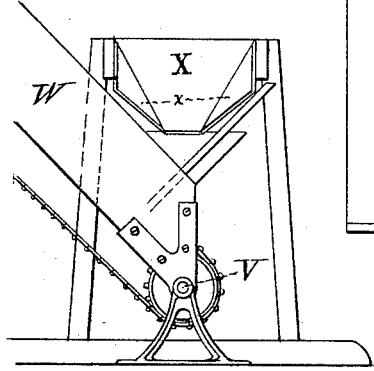
Figure 25:
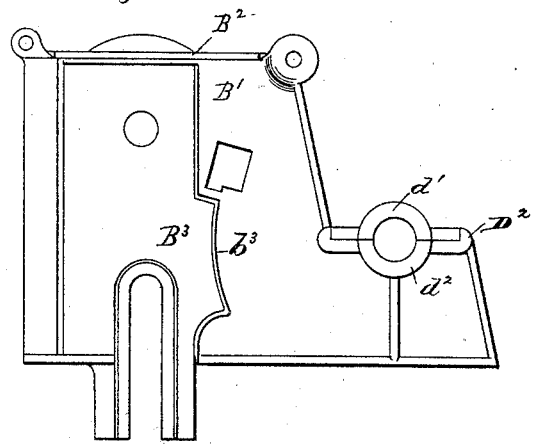
Figure 28:
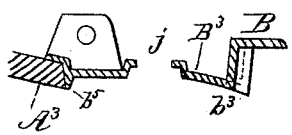
Figure 26:
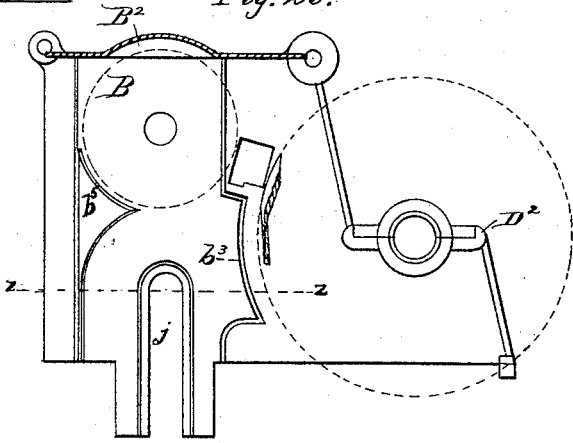
Figure 27:
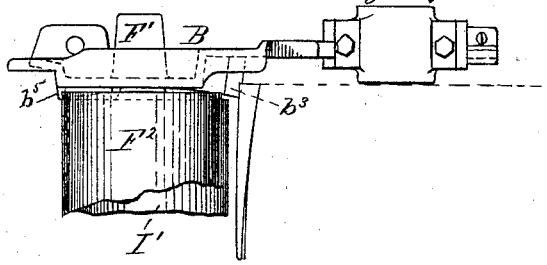

In the accompanying drawings, Figure 1 is a side elevation of my improved cutter, showing also a portion of a side-delivery carrier applied for removing the cut product; Fig. 1$^a$, a side view of the feed-box and its leg-support removed and folded for transportation, and Fig. 1$^b$ a vertical section through the adjustable discharge-spout. Fig. 2 is a plan view of the machine. Fig. 3 is a side view of a portion thereof looking from the right hand or opposite side from Fig. 1. Figs. 4 and 5 are side views showing the actuating-gearing for the upper feed-roll connecting with the cutter-cylinder shaft under two different arrangements or adjustments thereof for changing the length of cut. Figs. 6 and 7 are detail end views of the shifting levers and gears shown in Figs. 4 and 5, and Fig. 8 is a plan view of said levers and gears. Figs. 9 and 10 are side views showing further modifications in the arrangement of the gearing, &c. Figs. 11 and 12 show two forms of the lever-plate employed for supporting and adjusting the gears. Fig. 13 is a perspective view of the divided box for the cutter-cylinder shaft on which the lever-plate is journaled. Fig. 14 is a vertical section through one of the interposed double gears connecting the main driving and fixed feed-roll shafts. Fig. 15 is a side view similar to Fig. 4, but with the gearing adjusted to show the method of reversing the feed-rolls, also showing the ends of the stationary cutter-plate and its holder penetrating the machine side plate; Fig. 16, a face view of a portion of the fixed knife and its holder, showing one side plate in section; Figs. 17 and 18, sections through the knife-holder on the lines $xx$ and $yy$ of Fig. 16, respectively; and Fig. 19, an end view of the holder and knife, showing the manner of connecting them. Fig. 20 is a side view of the gearing connecting the movable and fixed feed-roll shafts; and Fig. 21, an end view of the same, partly in section, and showing the adjacent ends of the feed-rolls. Fig. 22 is a face view of the yielding or movable feed-roll, showing the yielding supports therefor, with one of the latter and the hanger and ball-and-socket bearing for the shaft of said roll in section. Figs. 23 and 24 are detail views showing the manner of connecting the yielding feed-roll guard with its supports. Fig. 25 is an outside view of one of the machine side plates. Fig. 26 is an inside view of the opposite side plate, with the circles described by the cutter-cylinder and fixed feed-roll shown in dotted lines; Fig. 27, a plan view of one of the side plates, showing the relation of the feed-rolls and cutting-cylinder thereto; Fig. 28, a horizontal section through said side plate on the line $zz$, Fig. 26, showing the offset in front of the cutting-cylinder; and Fig. 29 is a rear end view of the machine-frame, showing a carrier attachment applied and the relation of the discharge-spout thereto. Fig. 30 represents a vertical longitudinal section through the cylinder and feed-rolls.

The frame of the machine may be of any usual construction, and the feed box or hopper is preferably made detachable therefrom for purposes of packing, for transportation, &c., and where a long feed trough or box is employed, as indicated at A, Figs. 1, 1$^a$, and 2, for use in cutting corn or other long stalks, to avoid lengthening the frame for its support it is preferred to provide its outer receiving end with a pivoted leg-support, (indicated at A',) the upper ends of the uprights or legs of said support being hinged to the box near its outer end through suitable lugs $a$, attached to the lower face of said box. A brace A$^2$ is pivoted at its outer end to the cross-bar of the leg-support A' at $a'$, and when in use is connected at its inner end with a cross-bar of the machine-frame for properly supporting the legs A', but which, when the box is removed for transportation, folds with the leg-support against the bottom of said box. The box is provided with one short side-wing board A$^3$ and one long side-board A$^4$, the latter being provided with suitable pendent pins or bolts $a^2$, entering perforations in the bottom board of the box, which board may be applied to either side of the box, as described in my pending application, filed January 17, 1888, Serial No. 260,992.

The hood or cover $A^5$ of the hopper portion of the feed-box is provided with upright perforated ears $a^4$, affording bearings for a transversely-arranged rod $a^5$, to which levers $a^6$ $a^6$ are connected for sliding said shaft endwise, said levers being arranged one at each side of the hopper-cap for convenience in operating said shaft, to which the gear-shifting devices are connected, as will be explained.

B and B' indicate the side plates of the casing inclosing the feed-rolls, &c., and $B^2$ the cap-plate or cover therefor, the latter being hinged at its forward edge to the forward upper corners of the side plates in any suitable manner, permitting it to be raised, as shown in Fig. 15, or thrown open for giving access to the feed-rolls from above and to any obstructing matter that may get into the casing. This is important, especially in cold weather, when operating upon wet and frozen material, which accumulates around the rolls, and which, when the machine has been left standing for awhile, becomes frozen so compactly as to render the machine inoperative or render it in danger of breakage, and which can be readily broken up and removed with the lid $B^2$ raised without disturbing any other part of the machine. The part or section of this lid or cover directly overlying the upper feed-roll is raised or arched to conform to the upper part of the roll, as shown, for giving a compact form to the machine and at the same time affording space for the movement of sticky material adhering to said roll.

C indicates the hood covering the cutter-cylinder, having sides C', which cover the ends of said cylinder, and which is hinged at its upper forward end or edge to ears $b$ on the rear upper corners of the side plates B and B'. The hood conforms in the curvature of its upper part to the circle described by the cutter-cylinder; but its outer or rear portion behind said cylinder is approximately tangential to said curved part. The hood thus constructed can be swung up into the position shown in dotted lines in Fig. 1, in which it may be held by means of links $c$, pivoted at one end to suitable ears on the side plates B or other suitable points on the machine and at the other connected to ears $c'$ on the hood C. In this position, the machine having what is termed an "up cut," when operating upon cornstalks or other heavy material, the hood serves to effect a separation of the heavier parts of the stalks from the lighter parts of the material, such as the blades and tops, the action of the cylinder serving to throw the material up against the hood with great force, and, striking said hood at an obtuse angle and glancing therefrom, the heavier parts are thrown to a considerable distance from the machine, while the lighter parts fall near the machine, thus effecting the desired separation. This is important where it is desired to save only the lighter part of the material for feed.

The side plates B and B' are provided on their inner sides with elevations which contract the space between them, forming offsets $b^5$ immediately in front of the feed-rollers. The offset $b^5$ is continued downward by a narrow flange to the bottom of the side plate, so as to protect the lower roller as it yields to the different thicknesses of material fed to it. This offset can also be seen in the top views in Figs. 27 and 28, and which, extending inwardly beyond the ends of the feed-rolls, prevents the material from overlapping the ends of said feed-rolls and wrapping around them. The side plates B and B' are also provided at $B^3$, in line with the throat of the machine, with depressions on their outer sides, which contract the space between them and end in curved offsets $b^3$ in front of the cutting-cylinder. (See Figs. 25, 26, 27, and 28.) The throat of the machine extends from the offsets $b^5$ to the curved offsets $b^3$, which latter at their rear faces and below the stationary ledger-bar are in the arc of a circle conforming closely to the path in which the knives of the cutter-cylinder move. By reference to Fig. 28 it will be seen that the space between the side plates in the path of the material to the cutters is contracted at the point or offset $b^5$ and also from a point at or near the vertical plane of the axis of the feed-rolls to a point near the circle described by the knives of the cutting-cylinder, thereby causing the feed-throat to converge toward its end terminating in the offsets $b^3$, which overlap the ends of the knives. The material passing from the hopper of the machine is prevented from entering behind the roller by the offset $b^5$; but as it spreads out again by the compression of the rollers at or near the slot $j$ it is again converged by the offset $b^3$, so as to produce a hard compact mass and prevent the material from overlapping the ends of the knives. The action of the shearing-knife crowds the material to one side of the throat, and in the ordinary construction of these parts a greater or less quantity is drawn through at the end of the knife, according to the space left behind the knife and the throat of the machine, necessitating the sifting of the cut material to separate the long pieces. The converging throat, however, (shown herein,) throws the material inwardly toward the center of the machine and in practice overcomes this difficulty. The upper feed-roll, which rotates in fixed bearings, may have its ends perpendicular to its working face; but the lower roll, which has to vibrate to accommodate the varying thickness of the feed, has its ends slightly rounded, as indicated in Fig. 22 and by dotted lines in Fig. 27, to prevent them from catching on the side walls of plates when one end of said roll is depressed more than the other.

The cutter-cylinder (indicated at D, Fig. 15) may be of any usual construction, preferably that described in another application of even date herewith, Serial No. 329,128, has an upward cutting action, and has its shaft D' journaled in suitable boxes on the side plates of the machine-frame. These boxes are divided, as shown in Fig. 13, the lower part $d$ resting or formed on the side plates ($D^2$ indicating stiffening-ribs on said side plates) and the upper part $d'$ resting in sockets or recesses in the lower part, as shown, and secured thereto by through-bolts or in other suitable manner. The box $d\ d'$ is provided with a projecting tubular stud or sleeve $d^2$, surrounding the knife-cylinder shaft and formed in part on each of the two parts of the box. The lines of division of the two parts of this stud or sleeve are in vertical planes tangential to the sides of the central perforation, as shown in Fig. 13, in such manner that while the upper part of the box and its part of the sleeve can be readily lifted or drawn laterally out of place and yet afford a half-bearing for the shaft journaled in the box, its outer face forms only a small part—less than one-fourth—of the circumference of the sleeve in such manner that the lever-plate E, journaled on said sleeve, is still left properly supported when the upper part of the sleeve or box is withdrawn. This construction renders it practicable to remove the cutter-cylinder and its shaft and gears for repairs, &c., without removing the gear-lever and the gears connected therewith.

The lever-plate, as stated, is fulcrumed on the stud or sleeve $d^2$ and may be made either in the form shown at E in Figs. 1, 4, 5, 9, and 11 or in that shown at E' in Figs. 10 and 12, as preferred, so far as the functions hereinafter specified are concerned. The shaft D', which is provided on one side with the usual band or driving wheel and constitutes the main driving-shaft of the machine, is provided on its end, outside of the lever-plate E E', with a driving-pinion $D^3$, which constitutes a pivotal or central driving-gear and from which motion is communicated to the feed-rolls in a manner that will appear.

The lever-plate E (shown detached in Fig. 11) is provided with a perforation at $E^3$, through which it is journaled on the sleeve $d^2$, and with additional perforations $e$, $e'$, $e^2$, $e^3$, and $e^4$, through which stud-shafts may be secured to it, as follows: A stud-shaft $f$ is secured to the lever at $e$ and carries a gear-wheel $D^4$, engaging the pinion $D^3$, and a gear-wheel $D^5$, journaled on a stud $f^2$, is also secured to the lever-plate at $e^2$, Fig. 4. The gear $D^5$ is a double one, or has a pinion $D^6$ fastened to one side, and which engages and drives a gear-wheel F, fast on the shaft of the fixed feed-roll for driving the latter. By securing the stud $f^2$ to the lever E at $e^4$, instead of at $e^2$, and reversing the double gear, as shown in Fig. 5, the pinion part $D^6$ will engage the gear $D^4$, and the larger part $D^5$ of the double gear will engage and drive the feed-roll gear F, thereby changing the speed of the latter in a manner that will readily be understood. A stud $f'$, secured to the lever E at $e'$, carries a double gear $D^7$, one part of which engages the gear $D^3$, and the other, by the adjustment of the lever-plate E, may be thrown into gear with the feed-roll gear F when the double gear $D^5$ is thrown out for reversing the direction of rotation of the feed-rolls. The same arrangement of gears is shown in Fig. 10, where the lever-plate E' is employed, the only difference being that in the construction there shown the double gear $D^5\ D^6$ is mounted on a fixed stud secured to the side plate B of the machine instead of to the lever, and the point of separation of gears, when the feed-rolls are thrown out of action or their direction of rotation reversed, is between the gear $D^4$ and the double gear $D^5\ D^6$ instead of between the double gear and the gear F, the action or movement of the lever-plate being the same in both.

For convenience in changing the speed of the feed-rolls we prefer to use a gear-wheel F, consisting of a rim or ring both externally and internally toothed and secured to a dished web or arms F''', concave on their inner face, as shown. In this case we secure a stud $f^4$ to the lever-plate E at $e^3$, as shown in Fig. 9, and mount a double gear $D^8$ on it, Fig. 9, one part of which gear is in mesh with the gear $D^5$ and the other part of which may be thrown into or out of gear with the inner toothed face of the gear-rim F as the pinion $D^6$ is thrown out of or into mesh with the outer face thereof. The parts of the double gears $D^5$ and $D^8$ being of nearly the same size, (though preferably $D^8$ is made somewhat smaller than $D^5$, as shown,) where motion is imparted to the gear F through its inner toothed face, which is of less diameter and has fewer teeth than its outer face, the speed of said gear and of the feed-rolls operated thereby will be correspondingly increased.

The lever and gear-plate E has a lever-arm extension $E^2$ formed on or secured to it at its forward edge, said arm extending forward and upward by the side of the hopper and being connected through a bell-crank $g$, pivoted to the side of the frame, with the sliding rod $a^5$, by the adjustment of which, through the operation of either of the levers $a^6\ a^6$, above referred to, the lever-plate E can be rocked on its fulcrum-stud $d^2$ from either side of the feed-box for starting, stopping, or reversing the movement of the feed-roll gear F. This arrangement enables the operator to readily control the feed from either side of the machine, according to the location of the driving or band and fly wheels, which are made transferable from one side to the other as the location of the machine, its carrier, or motor may require.

The arrangement of the gearing connecting the yielding or movable feed-roll shaft with the fixed one operated by the gear F is shown in Figs. 20, 21, and 22. The shaft F' of the fixed feed-roll F², on which the driving-gear F is secured, as above stated, carries on its opposite end from that carrying the gear F a gear-wheel H, from which motion is imparted to a double or barrel gear H', mounted on a stud-shaft $h$, secured to the side plate B' and having one end of an arm or strap $h'$ pivoted to it, the outer end of said strap having a stud-shaft $h^2$, on which a spur-gear H² is mounted, said gear being also in mesh with the barrel-gear or pinion H' and receiving motion therefrom, the strap $h'$ permitting the wheel to vibrate upon or around the shaft $h$ as a center. The strap $h'$ has a hub or sleeve $h^3$ on its outer swinging end for the support of the stud-shaft $h^2$, and upon said hub is pivoted a pendent strap or hanger $h^4$, which near its lower end has a U-shaped bend $h^5$ in it, (see Fig. 22,) adapting it to pass around the toothed rim of a hollow round-faced gear-wheel or pinion I², fast on the shaft I of the lower or yielding feed-roll I'. The extreme lower end of the hanger $h^4$ is provided with a socket part $h^6$, the socket therein approximating a spherical form, but open at its sides, said part being formed, preferably, by being cast with the arm $h^5$ and around a perforated ball $i$, placed in the mold on a supporting rod or shaft conforming in diameter to that of the shaft I, to which the ball is to be applied, said ball being coated with plumbago or other material which will burn out in the process and prevent the adherence of the ball to the strap in a manner well known. A ball-and-socket joint is thus formed, which is found very effective and durable in use. The round-faced gear I² is dish-shaped or hollow, its hub and web or arms connecting the latter with the rim being at the inner side or face of the gear, as shown. By this construction, in connection with that of the hanger $h^4$, the ball-and-socket joint referred to is brought into the center of the gear I and into the same vertical plane with the gear H² and forms the pivotal center on which the shaft I and round-faced gear I² vibrate relatively to said driving-gear H², the strap $h^4$ serving to hold said gears always in proper working relation under any and all movements or vibrations of the shaft I.

The shaft I of the movable feed-roll is upheld in proper working relation to the fixed feed-roll F² in slots $j j'$ in the side plates B B' by boxes $k k$ on the upper ends of the rods $k' k'$, the lower ends of which enter the upper ends of upright sleeves or tubes L L, sliding in bearings or perforations in a transversely-arranged bar M. The tubes L have flanges $l$ formed on their upper ends and are upheld by spiral springs $l'$, surrounding them and resting on the bar M, their upper ends pressing against the flanges $l$. The upper ends of the rods $k'$, projecting above the tubes L, are angular in form, being bent outward and upward to bring the boxes $k$ into the plane of the side plates B and B' and into the slots $j$ $j'$, in which the shaft I moves up and down, and at the junction of said angular portion with the shank portion entering the tube L are provided each with a cap K, which rests on the upper end of the tube and has a horizontal rearwardly-projecting arm K', (see Fig. 23,) terminating in a double flange or button-shaped head $k^2$, the shank part $k^3$, connecting the two flanges being flattened (see Fig. 24) to adapt it to enter a slot $n$ in a pendent arm or ear N' of the roller guard or fender N until it reaches a circular opening $n'$, when it is turned therein, as shown. This roller-guard is secured to the arms K' before the latter are placed in position. This construction facilitates the attachment and removal of the guard or fender when required for any purpose and prevents accidental displacement of the latter, which by its connection with the rods $k'$, supporting the roller I', is adapted to yield and move with the roller, and thereby to always maintain a proper working relation thereto.

The transverse supporting-bar M has vertical grooves $m$ near its ends, which engage vertical ribs or ways $p$ on the opposite inwardly-facing walls of slotted brackets P P', secured to and pendent from the side-frame timbers. (See Figs. 1 and 22.) These brackets are provided near their upper ends each with a projecting ledge or ear $p'$, perforated to receive pendent bolts $p^2$, the heads of which rest in the ledges $p'$, and which at their lower ends pass through the bar M and are threaded to receive nuts $p^3$, by the adjustment of which the bar can be adjusted up or down on the ways $p$ for regulating the tension of the springs $l'$ and the pressure of the movable roll I'.

The knife-bar Q is secured to a holder-bar R, the ends of which pass through perforations in the side plates B and B' and are provided adjacent to said ends with foot flanges R', through which they are bolted to said side plates, as shown in Fig. 16. A single bolt $r$, passing through said flange and side plate at each side, in connection with a pendent lip $r'$, engaging a groove in the side plates, serves to secure the holder-bar firmly in place. The ledger-plate or knife-bar Q is set edgewise to receive the thrust of the knives, and its ends project through the perforations in the side plates and are secured to the projecting ends of the holder R each by a single bolt $q$. The bar midway between the side plates B B' has a perforated lug $r^2$ formed on its upper edge over the knife Q, and is adapted to receive a set-screw $r^3$, (see dotted lines, Fig. 18,) with a washer, which overhangs the upper edge of the removable ledger-bar, and which, when the screw is tightened, serves to clamp the ledger-bar firmly to the holder-bar R at the center of its length and to prevent any springing or deflection of the removable ledger-bar at that point.

I have shown both side plates perforated in the drawings; but it will be evident that one end of the removable ledger-bar can be inserted in a socket or secured against one of the side plates and the other end can be secured, as shown, outside of the side plate and withdrawn, reversed, and returned through the one perforation.

The removable ledger-bar has a rectangular form and has its sides grooved or made concave at $q'$ to facilitate grinding or sharpening and can be reversed and properly set or adjusted from the outside of the machine and all four of its angles used in succession, thereby greatly increasing its durability and obviating the necessity for frequent sharpening.

The cutter-cylinder shaft D' is provided near one of its ends with a sprocket-wheel S, the hub of which is clutch-faced to adapt it to engage the clutch-face of the hub of a band or driving and fly wheel T, fast on the shaft D'; or said wheel can be made transferable to the opposite end of the axle, on which is a collar T', also transferable and taking the place of the wheel T, as described in another application referred to of even date herewith, such change being made to permit the application of the carrier to and the feeding of the machine from either side.

U is a transversely-arranged shaft mounted in suitable bearing-brackets on the lower longitudinal frame-timbers and having a sprocket-wheel S' fast on it, to which motion is imparted through a chain S² from the sprocket-wheel S. The shaft U carries a bevel-wheel U', which engages and drives a bevel-wheel V', fast on a longitudinally-arranged shaft V, which has a bearing in the lower transverse frame-bar at the rear end of the machine and which projects beyond said bar and constitutes the lower driving-shaft of an endless carrier (indicated at W, Fig. 1) or is geared thereto in any suitable manner.

X is a discharge-spout located between the longitudinal frame-timbers underneath the cutting-cylinder to receive the cut material and deposit the same on the ground or on the carrier W. As the angle of the carrier has to be adjusted in practice to adapt it to deposit the cut material at different heights and points, I make the spout X adjustable to adapt it to discharge properly on the carrier under any adjustment of the latter. To this end it is provided with slotted ears $x'$, through which bolts $x^2$ pass into the side timbers of the frame. By loosening the bolts $x^2$ the spout can be set higher or lower or its angle changed to suit the position of the carrier, when by tightening the bolts again it will be held at the desired adjustment. The side walls of the spout (indicated at $x$) are made to approximate a right-angled triangle in form, with the long side or hypotenuse secured to the sloping bottom (indicated by X') and set sloping inward and converging toward the lower end of the bottom board, which is made tapering toward the lower end, making the spout contract toward the point of discharge and causing the delivery of the material in compact shape upon the ground or into a carrier W, which may be arranged to carry said material to either side of or straight away from the machine, as desired.

Having now described my invention, what I claim as new, and desire to secure by Letters Patent, is—

1. In a feed-cutter having an upward-cutting knife-cylinder, the combination, with said cylinder, of a hinged hood or cover made adjustable for deflecting and throwing outward the cut material thrown upward against it by the cutters, and thereby effecting a separation of the heavy from the light cut material, substantially as described.

2. The combination, with a vibratile lever-plate, of a bar or rod extending transversely across from side to side of the cutter and connected with said gear-plate, and handles or levers connected to said rod for vibrating said gear-plate by the endwise movement of said transverse rod.

3. In a feed-cutter, the combination, with the feed-rolls and the gearing for operating the same, of a lever-plate, a rod or bar connected thereto and located transversely of the machine for throwing said rolls into and out of action, and hand-levers connected to said rod and located at both sides of the cutter within easy reach of the operator, substantially as described.

4. In a feed-cutter, the combination, with the feed-rolls and gearing for driving and reversing the same, of a vibratile lever-plate carrying a portion of said gearing, and a rod or bar connected therewith at one end and adapted to be moved endwise or transversely across said machine for controlling the operation of said rolls, substantially as described.

5. The combination, with the cutter-cylinder shaft extended at both ends and a driving-pulley or fly-wheel therefor, either of which is interchangeable and adapted to be located at either side of said cutter, of a feed device for carrying the material to said cylinder, feed-gearing for starting and stopping said feeding device, a rod or bar suitably connected thereto having a transverse movement across said cutter for controlling the action of said device, and means, substantially as described, for operating said rod from either side of said cutter.

6. In a feed-cutter, the combination, with the feed-roll shafts and their connecting-gears, of a driven gear on one of said shafts, a driving-pinion therefor, and two vibratile gears in mesh with said driving-pinion, either of which may be made to actuate said driven gear, one direct and the other through an interposed gear for reversing the direction of rotation of the feed-rolls, substantially as described.

7. In a feed-cutter, the combination, with the feed-roll shafts and their connecting-gears, of a driven gear fast on one of said shafts, a driving-pinion therefor, intermediate connecting-gears, two of which rotate in opposite directions and either of which two may be made to actuate the driven gear, and a lever-plate carrying two of the intermediate gears in mesh with said driving-pinion, and by the adjustment of which lever-plate the direction of rotation of the feed-rolls can be reversed, substantially as described.

8. In a feed mechanism for feed-cutters, the gear F, in combination with two pinions adjustably mounted, either of which may be made to mesh with said gear F for actuating it, and an adjusting device for moving said pinions simultaneously one into mesh as the other moves out of mesh with said gear, substantially as described.

9. A lever-plate adjustable concentric with a central driving-gear, in combination with a suitably-mounted gear having teeth both on its inner and outer faces, two double or wide-faced vibratile gears on said gear-plate, either of which may be thrown into mesh by said gear-plate with the double-faced gear, and an interposed gear for connecting the central driving-gear with one of said vibratile gears, substantially as described.

10. In a feed mechanism, the driven gear F and a main driving-pinion, both suitably mounted, a vibratile lever having an eye-bearing concentric with said driving-pinion, and three intermediate gears for connecting said driven and driving gears, two of which are adapted to mesh with and vibrate about said central driving-pinion, substantially as described.

11. A lever-plate having an eye-bearing concentric with a stud or shaft carrying a central driving-pinion, in combination with a fixed feed-roll shaft having an actuating-gear thereon, intermediate gears for connecting said feed-roll gear and the central driving-pinion, two of said intermediate gears being held in mesh with said central gear and vibrating with said lever-plate, and a gear interposed between one of said vibratile gears and the gear on the feed-roll shaft, one or more of said intermediate gears being double or compound gears and one of said vibratile gears being thrown into mesh with the feed-roll gear for producing a reverse motion, the other connecting, when thrown in position, through the interposed gear, with the fixed feed-roll gear, substantially as described.

12. In a cutter, the knife-cylinder and feed-rolls, in combination with the side plates B and B' for supporting them, the knife-hood and the roller-cover both hinged at their forward ends to said side plates B and B', substantially as and for the purpose specified.

13. In a cutter, the top feed-roller and the side plates inclosing the same, in combination with a hinged cover for said roller, having a section above the roller raised or curved in the form of a segment of a circle to provide a clear space between the roller and cover, through which opening wet and sticky material adhering to the roller or cut material thrown forward by the centrifugal motion from the knife-cylinder may pass, substantially as described.

14. In a feed-cutter, the cutting mechanism and the perforated side plates, in combination with a fixed feed-roll, a fixed holder-bar secured in and made removable through the perforations in said side plates, and a reversible cutting-bar supported thereby, made oblong in cross-section and set edgewise to receive the stroke of the revolving knives, and made adjustable through and secured opposite the perforations in said sides, substantially as described.

15. In a feed-cutter, the cutting mechanism and the perforated side plates, in combination with a fixed feed-roll journaled in said side plates, a fixed holder-bar for scraping said roll, also secured directly to said side plates, and a reversible cutting-bar supported thereby, made oblong in cross-section and set edgewise to receive the stroke of the revolving knives, and made removable and adjustable through and secured outside the perforations in said sides by bolts through the ends of said bar, substantially as described.

16. In a cutter, the combination, with the perforated side plates, of the fixed holder-bar provided with a scraper for cleaning said roll, and having flanges R' near its ends for connecting said fixed roller and side plates, said bar having an extension of its ends inserted in perforations on the side plates, substantially as described.

17. The combination, with the perforated side plates B and B' and the fixed feed-roller, of the fixed holder-bar for cleaning said roller, secured in the perforations in said side plates, having lips engaging grooves or slots in said plates B and B' to prevent said fixed bar from moving, and the reversible cutting-plate secured thereto, substantially as described.

18. The combination, with the cutting-cylinder, of the reversible cutting-bar and a fixed holder-bar therefor, provided with a surface for receiving the reversible bar, and lugs or supports $r^2$, projecting from said fixed bar to support the reversible bar against the stroke of the knives, in form to present a pocket or shelf for collecting dirt or accumulation between the fixed and reversible bars, and means for securing said bars at or near their ends, substantially as described.

19. In a feed-cutter, the combination, with the fixed feeding-roll, of the side plates B and B', having perforations therein, the fixed holder-bar having its ends extended through and secured to the side plates, and the oblong-shaped ledger-bar set on its edge or narrow side, secured to the fixed bar at its ends, and also at a point intermediate the side plates, and adjustable through the perforations in said side plates, substantially as described.

20. The combination, with the cutter-cylinder and the feed-rolls of a feed-cutter, of the perforated side plates B and B', the fixed holder-bar having ends which project through and flanges thereon secured to said side plates, and a reversible ledger-bar, oblong in cross-section, set upright or on edge, the ends of which also project through the side plates and are secured against the ends of the holder-bar, substantially as described.

21. In a feed-cutter, the feed-rolls and knife-cylinder, in combination with side plates having the rear portions of their inner adjacent faces, which form the sides of the feed-throat, raised or provided with offsets and converging inwardly to contract the throat and form additional offsets in front of and overlapping the ends of the knife-cylinder, substantially as described.

22. The combination, with the feed-rolls and the knife-cylinder, of the side plates B and B', provided with offsets $b^5$ in front of and overlapping the ends of the feed-rolls and shaped to conform to the circle of said rolls, and a section of throat-surface converging in rear of the feed-rolls to form offsets $b^3$ in front of the knife-cylinder, and a knife-cylinder provided with knives overlapping said offsets $b^3$, substantially as described.

23. The combination, with the cutter-shaft having a pinion secured thereto, of a bearing for said shaft, provided with a projecting flange or sleeve on one side, forming a tubular stud or pivotal bearing, and a gear-plate or lever having its eye-bearing located on said projecting box-flange concentric with said shaft and carrying one or more gears in mesh with said pinion and permitting the vibration of said gears, substantially as described.

24. In a cutter, a shaft and a bearing or box therefor in two parts—viz., a removable part or cap and a fixed part—and a projection extending from one end of one of said parts, forming a supporting-sleeve or tubular stud having a periphery exceeding one-half of the entire circumference of said shaft, in combination with a plate or lever having its eye-bearing journaled on said extended sleeve or stud, substantially as described.

25. The combination, with the gear on the fixed feed-roll shaft, of a suitably-mounted double or barrel gear in mesh therewith, a vibrating gear held in mesh with said double gear and mounted on an arm vibrating around said double gear, and the yielding feed-roll gear connected by a strap or hanger to said vibrating gear, which latter is made larger in diameter than either of the two said gears in mesh therewith, substantially as described.

26. In a gearing for connecting the yielding and non-yielding feed-rolls, the non-yielding feed-roll gear, in combination with a double or wide-faced gear in mesh therewith and mounted on a fixed bearing, a vibrating gear held in mesh with said double gear by an arm adapting it to vibrate automatically about said gear in unison with the movements of the yielding roll and located in front of and outside of the plane of the fixed feed-roll gear, and the yielding feed-roll gear held in mesh with said vibratile gear by a strap or hanger, substantially as described.

27. The combination, in a feed-cutter, of a gear on the non-yielding feed-roll shaft, the double or wide-faced gear in mesh therewith journaled upon a fixed stud upon the frame, and a vibratile gear held in mesh with said double gear and with the gear upon the yielding feed-roll shaft, said traveling gear being adapted to describe the arc of a circle around the face of the gear upon the fixed stud on the same side as and in front of the fixed feed-roll gear, so as to move in approximately the same path as that traveled by the gear upon the yielding feed-roll shaft, substantially as described.

28. In a feed-cutter, the combination, with the yielding feed-roll and its shaft, of two gears, one of which is round-faced and one of which is secured to said shaft, said gears being held in mesh by a strap or hanger provided with a circular cavity open at its sides and carrying a perforated ball forming a ball-and-socket bearing for said shaft and located centrally of said round-faced gear for permitting the shaft and gear to rock, substantially as described.

29. In a feed-cutter, the combination, with the yielding feed-roll shaft, of two intermeshing gears adapted to vibrate therewith, one of which is secured to said shaft and has its teeth rounded or curved across its face, said gears being held in mesh by a strap or hanger provided with a ball-and-socket bearing for said shaft and located centrally of said round-faced gear, permitting the shaft and gear to rock, and a suitably-mounted driving-gear therefor, substantially as described.

30. The combination, with the yielding feed-roll shaft, of the perforated ball in which said shaft is journaled, and a socketed vibratory arm or hanger cast loosely but solidly around said ball, not permitting its removal, but allowing it to rotate and vibrate freely with said shaft in the socket, substantially as described.

31. In a feed-cutter, a driving-wheel suitably mounted, in combination with a yielding shaft and two intermeshing vibratory gears connected with said driving-wheels, one of which is secured upon the said yielding shaft and provided with a perforated universal ball-bearing for said shaft located centrally of said gear, and a socketed hanger cast loosely about said ball, whereby either the shaft may revolve within the ball or the ball within the socket, or both at the same time, said vibratory gears having teeth in form to permit the shaft and ball to vibrate freely within the socketed hanger to its varying angles, substantially as described.

32. The supports for the yielding feed-roll and its shaft, provided with arms or extensions for supporting the roller-guard, in combination with the slotted roller-guard, engaging in said arms and located at the rear of the yielding feed-roll, substantially as described, whereby it is adapted to be readily connected with and removed from said arms, as set forth.

33. A yielding feed-roll, in combination with a device for applying pressure to said roll, provided with a roller-guard attached thereto, located at the rear of said roll and arranged to vibrate with said roll, whereby said roller-guard can drop more upon one side than on the other.

34. The fixed and yielding feed-rolls and the cutting mechanism, in combination with a device, substantially as described, for applying pressure to said rollers, arranged to carry a roller-guard located at the rear of the yielding roll and adapted to move with it in position to prevent the cutting-cylinder from throwing the cut material forward over or under said roll, substantially as described.

35. The combination, with the shaft of the yielding feed-roll, of the supporting-rods having boxes for said shaft, springs upholding said rods, the bar upholding said rods and springs and having slots or grooves therein, the brackets or vertical ways on which said grooved or slotted bars move, and the bolts for adjusting said bar and the tension of the springs, substantially as described.

36. The perforated bar or spring-rest upholding the yielding feed-roll, in combination with the flanged tubes, the springs surrounding said tubes, and the rods engaging said tubes and having boxes for the feed-roll shaft, substantially as described.

37. The combination, with the shaft of the yielding feed-roll and the bearings therefor, of the perforated bar M, the tubes L L, supported thereon, and the rods $k'$ $k'$ inserted in and the springs $l'$ $l'$, surrounding said tubes, substantially as described.

38. In a feed-cutter, the combination, with an angle-carrier attachment, of the discharge-spout having an inclined triangular bottom and triangular side plates sloping both downwardly and toward each other and converging near the point of discharge, whereby it is adapted to deliver into an inclined side-delivery carrier, substantially as described.

39. In a feed-cutter adapted to discharge the cut material into a carrier attachment, the combination, with the cutting-cylinder and machine-frame, of a movable discharge-spout for said cutting-cylinder, and means for adjusting the height of said spout to correspond to the angle of elevation of the carrier attachment, substantially as described.

40. The combination, with the machine-frame and the feeding and driving mechanism thereon, of a feed-table forming a horizontal extension, said frame being provided with a hopper secured to said feed-table and removable therewith, and a side board removable and adjustable to either side of said feed-table, substantially as described.

In testimony whereof I have hereunto set my hand this 14th day of October, A. D. 1889.

ELMORE W. ROSS.

Witnesses:
CHAS. L. WHEATON,
L. WILBER CRANE.